July 25, 1944.    H. R. GREENLEE    2,354,257
TRANSMISSION
Filed Feb. 25, 1943    2 Sheets-Sheet 1

INVENTOR.
Harry R. Greenlee
BY

INVENTOR.
Harry R. Greenlee

Patented July 25, 1944

2,354,257

UNITED STATES PATENT OFFICE 2,354,257

TRANSMISSION

Harry R. Greenlee, South Bend, Ind., assignor to The Studebaker Corporation, South Bend, Ind., a corporation of Delaware Application February 25, 1943, Serial No. 477,061

2 Claims. (Cl. 74—272)

The present invention relates to an improvement in a transmission.

My invention contemplates the provision of a transmission particularly adapted for automatic operation. I contemplate the provision of a plurality of planetary or epicyclic gear systems suitably arranged to provide any desired number of different gear ratios or direct drive through the transmission. In the preferred form of my invention, I provide a plurality of planetary or epicyclic gear mechanisms and incorporate therewith suitable one-way brake devices for obtaining continuous application of torque from the drive to the driven shafts even while any of the planetary gear units are being actuated to select a desired gear ratio. Preferably I also incorporate a planetary gear mechanism to obtain a reverse drive. The one-way brakes previously referred to are utilized primarily for obtaining the continuous application of torque to the final or intermediate driven shafts during shifting operations. However in order to prevent free wheeling on over running of the on-way brakes through the transmission brake means are provided for engaging brake surfaces formed with the transmission housing.

In the present application I have disclosed a transmission comprising three planetary gear systems suitably arranged and interconnected to provide four forward speeds and in the embodiment of the invention described one selective reverse speed although it will appear from the disclosure that other reverse speeds are attainable from the structure disclosed and described in detail hereinafter.

The present transmission may be constructed of any desired number of planetary gear systems it being understood that the number employed is dependent upon the desired number of gear ratios. The specific transmission herein disclosed is particularly adapted for use in an automotive vehicle, and the forward speeds correspond to the speeds commonly referred to in the language of the automotive art as first, second, third and fourth or overdrive speeds.

It will be understood therefore, that while the transmission disclosed is primarily intended for automotive vehicles, the invention is not intended to be limited thereto and that if desired a larger number of planetary gear units may be incorporated in the transmission without departing from the invention.

According to my invention a transmission suitable for automotive vehicles comprises three planetary gear units or systems arranged in series. Each planetary gear system comprises a sun gear, a ring gear, and a planet carrier having pinions meshing with the sun and ring gears. In two of the planetary gear systems utilized for direct drive and for ratio drive in but one direction therethrough, I preferably incorporate a one way brake which is suitably associated with an element of each planetary gear system and a portion of the transmission housing, and so arranged with respect to the planetary gear systems that continuous torque is applied from the drive shaft to the driven shaft in shifting from direct to ratio drive, or ratio to direct drive in each of these planetary gear systems. I incorporate a torque transmitting means with each of the planetary gear systems which are actuatable to lock two elements of each of the planetary gear systems to each other whereby the gear system is locked up providing a direct drive therethrough. The torque transmitting means referred to is shiftable to a second position in which it engages a portion of the transmission housing to hold one element of the planetary gear systems against rotation to prevent free wheeling through the transmission. Preferably I provide a pair of planetary gear systems each of which comprises dual planet pinions so that when the torque transmitting means of these planetary gear systems are actuated to effect ratio drive, the driven element is rotated in the same direction as the driving element. With such arrangement of two planetary gear systems in series, I provide a third planetary system comprising single planet pinions which is adapted to be locked up for direct drive therethrough so that the ultimate driven shaft rotates in the same direction as the drive shaft, it being understood that the several forward ratio speeds are attained by means of the first two planetary gear systems.

Upon actuation of the torque transmitting member of the third planetary gear system to hold one of the elements thereof against rotation the shaft driven thereby is rotated in a direction opposite to the direction of rotation of the drive shaft of the transmission. The latter is utilized to effect a reverse drive through the transmission. It will be understood from the detail description of my invention that a one-way brake is not incorporated with the third planetary gear system, providing for reverse rotation of the driven shaft, since it is not essential, in that the forward drive through this portion of the transmission is obtained by locking up the planetary gear system.

Now in order to acquaint those skilled in the art with the matter of constructing and operating a transmission in accordance with our invention I shall describe in the conjunction with the accompanying drawings a preferred embodiment of the invention designed particularly for use with an automotive vehicle.

Figure 1:
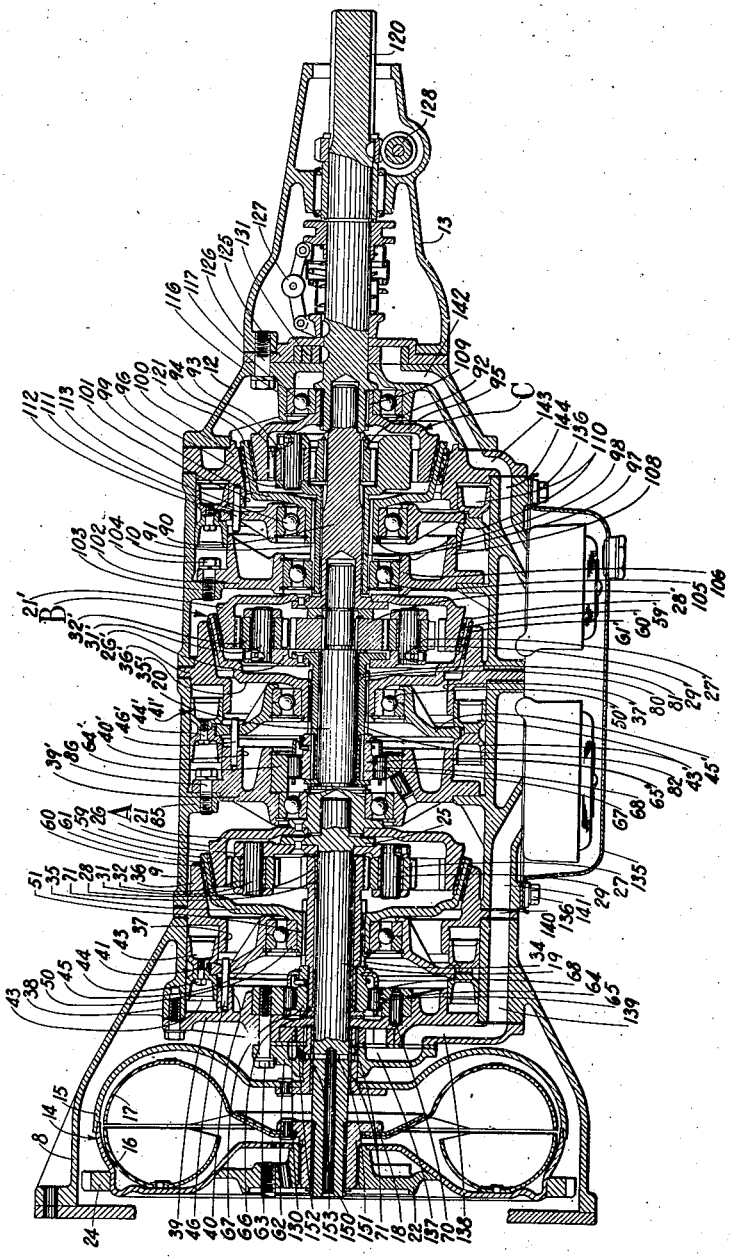
Figure 1 is a vertical detail sectional view of a transmission incorporating our invention.

Referring now to Figure 1, I have shown a transmission comprising a bell housing 8, a pair of intermediate housing sections 9 and 10, a frusto-conical end housing 12 and a governor and speedometer gear housing 13 secured to the outer end of the housing 12. A fluid unit 14, which in the present disclosure is a fluid coupling, is disposed within the bell housing 8, and a plurality of planetary gear systems A, B and C are arranged in longitudinal series and are disposed within the housing sections 9 and 10 and the frusto-conical end housing 12 of the transmission.

The fluid coupling 14 is of known construction and comprises the usual housing 15 enclosing the impeller 16, which is suitably secured to the housing 15 for rotation therewith, and the rotor 17 which, together with the housing 15 and impeller 16 form the component parts of the fluid coupling. The rotor 17 is secured to a hub member 18 which is suitably splined to a shaft 19 constituting the drive shaft of the transmission. The shaft 19 is journaled at its rearward end in the hub portion of a first driven shaft 20, and the hub portion has suitably secured thereto the ring gear 21 of the first planetary gear system A. An end plate member 22 is secured to the forward side of the fluid coupling housing 15 and is provided with suitably tapped bores for connecting the fluid coupling housing to the crank shaft of a prime mover or the like. The plate member 22 and the fluid coupling housing 15 may be provided with suitable ducts or ports for admitting fluid into the coupling as is well known in the art. A starting gear 24 is suitably secured to the periphery of the fluid coupling housing 15. The drive shaft 19 is provided adjacent its rearward end with an enlarged annular flange 25, and a planet pinion carrier 26 is suitably secured to this flange as by a plurality of rivets or the like. The planetary gear system A is of the type comprising a plurality of dual planet pinions, and is provided with a plurality of planet pinions 27 which mesh with the gear teeth of a sun gear 28. The planet pinions 27 are each mounted for rotation about a spindle 29, the opposite ends of which are suitably secured in the planet pinion carrier 26. A plurality of planet pinions 32 are also provided, and each is mounted for rotation about a spindle 31. It will be understood that a suitable bushing or sleeve is provided between the several spindles and the associated planet pinions. As before, the spindles 31 are secured at their opposite ends to the planet pinion carrier 26. The planet pinions 32 have meshing engagement with the planet pinions 27, and the internal teeth of the ring gear 21, and the planet pinions 27 have meshing engagement with the sun gear 28. The sun gear 28 is provided with an elongated hub portion 34 having external splines, upon which a torque transmitting member 35 is mounted for axial shifting movement coaxially of the shaft 19. A braking member 36 forming a part of the transmission housing is provided with a peripheral flange which is secured between the adjacent ends of the bell housing 8 and the first housing section 9, and is further provided with an inwardly disposed and forwardly extending annular flange 37 which, together with an inwardly disposed annular flange 38 of the bell housing 8, and the inwardly disposed rearwardly extending annular flange 40 of an end partition member 39 forms an annular cylinder for reception of an annular piston 41. The end partition member 39 is suitably secured along its periphery to an enlarged boss portion formed at the forward end of the flange 38. The piston 41 comprises a pair of substantially U-shaped annular rings 43 the bases of which are secured in abutting relation by a plurality of bolts 44. A shifter member 45 has its outer periphery disposed in a annular yoke formed in the inner periphery of the base portions of the U-shaped annular rings 43. A guide pin 46 is suitably fixed in the flange 40 of plate member 39, and extends through an opening formed adjacent the outer periphery of the shifter member 45 for preventing rotation of the latter. A ballbearing assembly 50 is disposed between the shifter member 45 and the hub portion 51 of the torque transmitting member 35 providing for longitudinal shifting movement of the torque transmitting member 35 coaxially of the shaft 19 upon movement of the piston 41 in the cylinder in which the latter is disposed. The torque transmitting member 35 is provided a frusto-conical flange 59 having frusto-conical friction rings 60 and 61 secured to its outer and inner faces, respectively. It will be observed that the friction surface of the ring gear 21 adapted to be engaged by the friction ring 61 carried by the torque transmitting member 35, and the brake surface of the brake member 36, and the friction ring 60 of the torque transmitting member 35 extend angularly in the same direction. The parts are arranged in overlapping relation which provides for considerable reduction in length of the transmission, and by this arrangement of the ring gear with the torque transmitting member substantially encloses the planetary gear system A, preventing the entrance of dirt or other deleterious materials which would be harmful to the gearing. An end plate member 62 is secured to the forward face of the end member 39 by a plurality of bolts 63 the threaded ends of which thread into an annular ring 64 providing an annular brake surface along its inner periphery for a one-way brake 65. The sun gear 28 at its forward end is provided with a second reduced portion 66 which is splined for receiving the cam member 67 of the one-way brake 65. A plurality of rollers 68 are disposed between the cam surface of the cam member 67, and the annular brake surface of the ring member 64 of the one-way brake. The one-way brake is of conventional construction, and it is believed need be described in further detail for an understanding of the present invention. A pin 70 is provided between the annular ring member 64, and the end partition member 39 to prevent rotation of the former. It will be noted that bushings 71 are provided at spaced intervals along the drive shaft 19 so that the fluid unit housing 15, and the sun gear 28 are journaled for rotation thereon. In the structure thus far described it will be seen that when the piston 41 is shifted to the right to engage the torque transmitting member 35 with the ring gear 21 a direct drive will be transmitted from the drive shaft 19 to the driven shaft 20 since the sun gear 28 is secured to the ring gear 21. Upon shifting of the torque transmitting member 35 to the left, responsive to movement of the piston 41 to the left, the friction ring 60 will engage the braking surface of the brake member 36 holding the sun gear against rotation so that a ratio drive is transmitted by the drive shaft 19 through the planet carrier 26 the planet pinions 27 and 32, the ring gear 21, to the first driven shaft 20. The one-way brake 65 is arranged so that with the parts in the position last described, and upon movement of the piston 41 to the right to dispose the torque transmitting member in neutral position, the one-way brake 65 acts to hold the sun gear 28 against rotation so that the application of torque to the driven shaft 20 from the drive shaft 19 is not interrupted. When the torque transmitting member 35 is shifted to the right to engage it with the ring gear 21, the one-way brake 65 overruns and direct drive is transmitted through the planetary gear system A. When the torque transmitting member 35 is positioned to effect ratio drive, it is desirable to provide the torque transmitting member with the friction ring 60 for engaging the braking surface of the brake member 36 to positively lock the sun gear 28 to the transmission housing to preevnt overrunning of the driven shaft 20 with respect to the drive shaft 19. Since the primary function of the friction ring 60 and the brake member 36 is to prevent this overrunning, it will be understood that only a small holding force is necessary.

In the present application, I have not shown any means for causing shifting movement of the piston 41 to either the right or the left, but it will be understood that suitable actuating means preferably hydraulic in character may be provided and controlled by a suitable valve arrangement for admitting fluid to either end of the cylinder to either side of the ring-shaped members 43 for causing shifting movement of the piston 41. It will further be observed, if desired, a coil spring or other suitable spring means may be associated with the cylinder and the right hand annular ring member 43 for urging the piston 41 to the left so that in the absence of pressure on the annular ring 43 disposed in the left hand end of the cylinder, the torque transmitting member will be normally urged to engage the braking member 36 providing for ratio drive through the planetary gear system A. In the specific embodiment of my invention herein disclosed the gun gear 28 comprises twenty-four teeth, each of the planetary pinions 27 and 32 comprises eighteen teeth, and the ring gear 21 comprises eighty-one teeth so that when the parts are positioned for ratio drive a gear ratio of 1.42 is obtained, i. e. upon 1.42 revolutions of the drive shaft 19 the driven shaft 20 is rotated once.

The planetary gear system B is in its major respects similar to the planetary gear system A and the prime reference numerals indicate like or similar parts already described in conjunction with the planetary gear system A. However, in the planetary gear system B, in the embodiment of the invention herein-disclosed, the sun gear 28' is splined for rotation with the first driven shaft 20 and comprises thirty-six gear teeth. Further, the planet pinion carrier 26' is suitably secured to a sleeve member 80 which is rotatably mounted coaxially of the first driven shaft 20 and independently thereof, suitable bushings 81 being provided therefor adjacent the forward and rearward ends of the sleeve 80 and between it and the first driven shaft 20. The torque transmitting member 35' is splined for shifting movement coaxially of the first driven shaft 20 on the splined hub portion 82 of the sleeve 80. The one-way brake 65' comprises the cam member 67' splined to a reduced portion at the forward end of the sleeve 80, and an annular ring 64' having an annular braking surface along its inner periphery for cooperation with the rollers 68' providing a one-way brake operable in much the same manner as the one-way brake 65 of the planetary gear system A. The annular ring member 64' is suitably secured to the partition member 39' which is secured adjacent its periphery to an inwardly extending integral annular flange 85 of the housing section 9, as by a plurality of bolts 86. The braking member 36', together with the forwardly inwardly disposed integral flange 40' of the partition member 39' form an annular cylinder for reception of the annular piston 41'. The annular piston 41' is constructed in the manner previously described, and the like prime reference numerals indicate parts similar to those described in conjunction with the planetary gear system A. In the planetary gear system B, the planet pinions 27' and 32' each preferably comprise eighteen teeth, and the ring gear 21' comprises seventy-eight teeth which together with the thirty-six tooth sun gear 28' provides for a gear ratio of 2.164.

It will be seen that when the torque transmitting member 35' is positioned to the left upon movement of the piston 41' to the left, the friction ring 60' will engage the braking surface of the braking member 36' to hold the planet carrier 26' and pinions 27' and 32' against rotation about the axis of the first driven shaft 20. With the parts in this position, a ratio of 2.164 is established between the first driven shaft 20 and a second driven shaft 90 an enlarged annular flange portion of which is suitably secured to the ring gear 21' as by rivets or the like. When the piston 41' is actuated for shifting movement to the right the one-way brake 65' acts to hold the planet carrier 26' against rotation in the intermediate or neutral position of the torque member 35' so that there is no interruption of the torque from the first driven shaft 20 to the second driven shaft 90 during shifting movement. Upon engagement of the friction ring 61' with the friction surface of the ring gear 21' the torque transmitting member acts to lock the planet carrier 26' to the ring gear 21' to effect a direct drive through the planetary gear system B and the one-way brake 65' overruns. It will be understood that the piston 41' is adapted to be actuated by any suitable means as for example that splined for shifting movement coaxially of the first driven shaft 20 on the splined hub portion 82 of the sleeve 80. The one-way brake 65' comprises the cam member 67' splined to a reduced portion at the forward end of the sleeve 80, and an annular ring 64' having an annular backing surface along its inner periphery for cooperation with the rollers 68' providing a one-way brake operable in much the same manner as the one-way brake 65 of the planetary gear system A. The annular ring member 64' is suitably secured to the partition member 39' which is secured adjacent its periphery to an inwardly extending integral annular flange 85 of the housing section 9, as by a plurality of bolts 86. The braking member 36', together with the housing section 9 and the forwardly inwardly disposed integral flange 40' of the partition member 39' form an annular cylinder for reception of the annular piston 41'. The annular piston 41' is constructed in the manner previously described, and the like prime reference numerals indicate parts similar to those described in conjunction with the planetary gear system A. In the planetary gear system B, the planet pinions 27' and 32' each preferably comprise eighteen teeth, and the ring gear 21' comprises seventy-eight teeth which together with the thirty-six tooth sun gear 28' provides for a gear ratio of 2.164.

It will be understood that the piston 41' is adapted to be actuated by any suitable means as for example that described in conjunction with the piston 41. As before, engagement of friction ring 68' with the braking surface of the brake member 36' prevents overrunning of the second driven shaft 90' with respect to the first driven shaft 20 when the planetary gear system is actuated for ratio drive.

The first driven shaft 20 is formed with a reduced portion at its rearward end, and is suitably journalled for rotation in a recess provided in the forward end of the second driven shaft 90. The second driven shaft 90 is provided with an intermediate splined portion 91 which carries the sun gear 92 of the planetary gear system C. The planetary gear system C further comprises a plurality of planet pinions 93 meshing with the teeth of sun gear 92 and the internal teeth 94 of the ring gear 95. A planet pinion carrier 96 is suitably mounted for rotation about the second driven shaft 90 and is provided with an intermediate splined portion 97 about which the internally splined hub 98 of a torque transmitting member 99 is mounted for longitudinal shifting movement coaxially of shaft 90. A brake member 100 also forming a part of the transmission housing is secured between the adjacent ends of the housing section 10, and the frusto-conical end housing 12, and is somewhat similar to the braking members 36 and 36' of the previously described planetary gear system in that it is provided with a rearwardly extending and inwardly disposed annular flange 101. A partition member 102 is secured to an integral inwardly directed flange 103 formed integrally with the housing section 10 by means of a plurality of bolts 104. Suitable ballbearing means 105 is disposed between the forward end of the sleeve 97 and the annular inner flange 106 of the partition member 101. The partition member 102 is further provided with an inwardly disposed and rearwardly extending annular flange 108 similar to the annular flanges of the members 39 and 39' previously described, which together with a portion of the housing section 10 and the annular flange 101 of the braking member 100 defines a cylinder for reception of the piston 110. The piston 110 is similar in all respects to the pistons 41 and 41' previously described and as before receives the outer peripheral edge of a shifter member 111. A guide pin 112 is seated at one end in the annular flange 101 of the member 100 and prevents rotation of the shifter member 111. A ball bearing assembly 113 is disposed between the inwardly directed annular flange of the shifter member 111, and the splined hub portion 98 of the torque transmitting member 99. The planetary gear system B is a simple planetary gear system comprising only one set of planet pinions. The ring gear 95 has disposed between a hub portion 109 thereof extending rearwardly of the transmission, and an inwardly disposed and rearwardly directed flange 116 of the frusto-conical housing 12, a bearing assembly 117 providing a journal mounting of the ring gear 95. A third driven shaft 120 which in the embodiment described is the final driven shaft is suitably splined to the hub portion 109 of the ring gear 95 and is adapted to rotate therewith. It will be seen that the second driven shaft 90 is provided with a reduced rearward end portion which is suitably journaled in a recess provided therefor in the forward end of the third or final driven shaft 120. In the planetary gear system C in the position of the part shown in Figure 1, it will be seen that the torque transmitting member 99 is in position coupling the planet pinion carrier 96 to the ring gear 95 so that a direct drive is being effected through this planetary gear system to the final driven shaft 120. Actuation of the piston 110 to the left to shift the torque transmitting member 99 to the left will cause engagement of the friction ring 121 with the braking surface of the braking member 100 holding the planet carrier 96 against rotation effecting the planetary gear system C reverse drive through i. e. rotating the third driven shaft 120 in opposite direction as to that of the first and second driven shafts 20 and 90 respectively. The planetary gear system C in the forward drive through the transmission is actuated to effect direct drive therethrough, and provides for a reverse drive to the third or final driven shaft when the torque transmitting member 99 is disposed to the left with the friction ring 121 in engagement with the braking surface of the braking member 100 thus providing a reverse for the transmission. In the specific embodiment of the invention herein disclosed the sun gear 92 preferably comprises 20 teeth, the planet pinion 16 teeth and the ring gear 95, 52 teeth so that when the torque transmitting member 99 is actuated to the left to effect a ratio and reverse drive therethrough a ratio of 2.6 is effected. An end closure plate 125 is suitably secured between the adjacent ends of the frusto-conical housing 12 and the governor and speedometer housing 13. The parts referred to are adapted to be secured together by a plurality of bolts 126. The governor indicated generally at 127 is of conventional construction, as is the speedometer gear arrangement indicated generally at 128, and the arrangement of the governor 127 and the speedometer gear means 128 with the third or final driven shaft forms no part of the present invention.

Hydraulically operable duct systems for shifting of the pistons 41, 41' and 110 are well known in the art and admission of fluid to either or both of the ends of the cylinders therefor are well known and may be governor controlled as by the governor 127. However, since the shifting means for shifting of the several planetary systems forms no part of the present invention it is believed that it need not be described in further detail.

It will be observed that we have provided a pair of conventional gear pumps 130 and 131, the gear pump 130 being disposed in a housing formed in the end partition member 39 and the end cap member 62, and the gear pump 131 is disposed in a housing formed by the rearward end wall of the frusto-conical housing 12 and the end plate member 125. An oil plan 135 is secured to the lower end of the transmission as by a plurality of bolts 136, and it will be seen that the end cap member 62, the end plate member 39, bell housing 8, braking member 36, housing section 9, are provided with ducts 137, 138, 139, 140 and 141 respectively, leading to the oil pan 135 providing for a supply of fluid for the pump 130. Similarly, the frusto-conical housing 12, the braking member 99 and the casing section 10 are provided with ducts 142, 143, 144, which extend from the oil pan 135 to the housing for the gear pump 131. Also, it will be seen that the rearward end of the drive shaft 19 is provided with longitudinally and transversely extending ducts 150 and 151 respectively, there being an angularly extending duct 152 in the end cap member 62 communicating through duct 153 provided in an intermediate portion of the hub to which the housing 15 is secured, which hub is journaled for rotation independently of shaft 19. The duct 150, 151, 152 and 153 providing for delivery of fluid to the coupling housing 15 to maintain the unit charged so that torque will be transmitted thereto.

Figure 2:
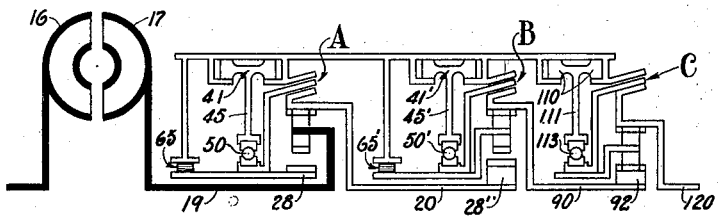
Figure 2 is a diagrammatic view of the transmission of Figure 1, showing the position of the several parts when the transmission is in neutral.

The gear ratios of the aforementioned planetary gear systems A, B and C have been selected for use with a 3.28 axle and with this specific embodiment in mind reference may now be had to Figure 2 which illustrates diagrammatically the positions of the several parts when the transmissions is in neutral. In Figures 2 through 7, the heavy lines indicate the drive through the transmission. It will be understood that the specific gear ratios herein disclosed are considered only to be a preferred embodiment of the invention, and are not intended to be limiting since it will be obvious that various other ratios may be designed for other purposes or to accomplish other results.

In Figure 2 the torque transmitting members 35 and 35' of the planetary gear systems A and B are in neutral position and consequently no torque is being transmitted through the transmission. With the torque transmitting members 35 and 35' of the planetary gear systems A and B in neutral position, no torque will be transmitted through the transmission.

Figure 3:
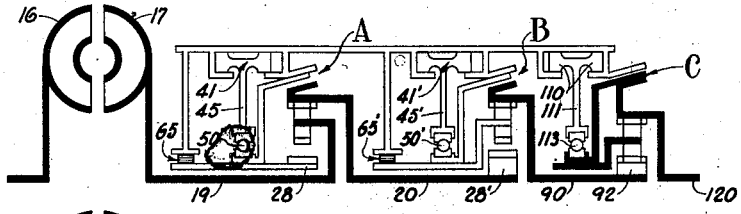
Figure 3 is a diagrammatic view of the transmission of Figure 1, showing the position of the parts providing for a first gear ratio.

Referring now to Figure 3, it will be seen that the torque transmitting members 35 and 35' of the planetary gear systems A and B are both shifted to the left for engaging the braking members 36 and 36' respectively. The planetary gear system C is locked up for direct drive since the torque transmitting member thereof is shifted to the right locking the planet carrier to the ring gear 95. With the parts in this position the first gear ratio or first speed is obtained and it will be seen from the specific gear ratios for each of the planetary gear systems hereinbefore set forth that planetary gear system A has a ratio of 1.42, planetary gear system B has a ratio of 2.164, which when used in conjunction with a 3.28 axle results in a final ratio of 10.25.

Figure 4:
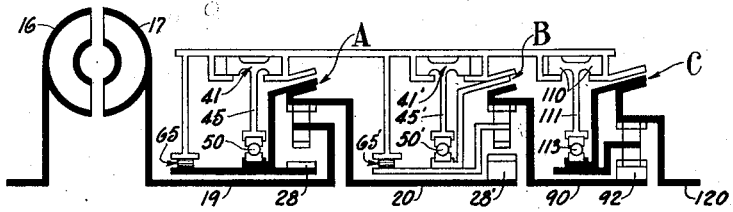
Figure 4 is a diagrammatic view of the transmission of Figure 1, showing the positions of the parts providing for a second gear ratio.

In Figure 4 the parts are positioned for a second gear ratio or second speed, and it will be seen that the torque transmitting member 35 of the planetary gear A is shifted to the right to provide direct drive through this planetary gear system, and that the torque transmitting member 35' of the planetary gear system B remains in its left hand position providing a ratio of 2.164 through this planetary gear system and as before the planetary gear system C is locked up for direct drive therethrough. With the parts in the position described it will be seen that the ratio of planetary gear system A is 1, the ratio of planetary gear system B is 2.164, which together with a 3.28 axle a final drive of 7.18 is effected.

Figure 5:
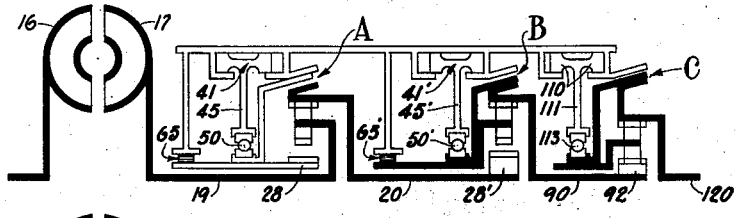
Figure 5 is a diagrammatic view of the transmission of Figure 1, showing the positions of the parts providing for a third gear ratio.

In Figure 5 I have shown the position of the parts for a third gear ratio or third speed and it will be seen that the torque transmitting member 35 of the planetary gear system A is shifted to the left to engage the braking member 36, providing a ratio drive therethrough, torque transmitting member 35' of the planetary gear system B is shifted to the right providing direct drive through this planetary gear system, and the planetary gear system, and the planetary gear system C is locked up providing direct drive therethrough. With the gear ratios previously described it will be apparent that in planetary gear system A there is a ratio of 1.42, direct drive through planetary gear system B and direct drive through planetary gear system C which together with the 3.28 axle gives a final ratio of 4.66.

Figure 6:
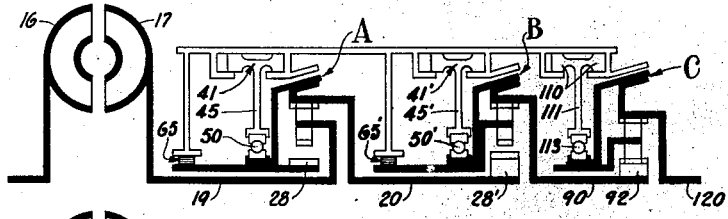
Figure 6 is a diagrammatic view of the transmission of Figure 1, showing the positions of the parts providing for a direct drive through the transmission.

In Figure 6 the torque transmitting members of all the planetary gear systems A, B and C are all shifted to the right and a direct drive is being effected through the transmission. This drive through the transmission in conjunction with the 3.28 axle gives an ultimate drive of 3.28. It will be observed, therefore, that in the final forward drive through the transmission, that all the planetary gear systems will in effect, be flywheels and there is no transmission of any torque through the gearing of the transmission which is highly desirable in the automotive art since this will correspond to the fourth or final drive of the vehicle.

Figure 7:
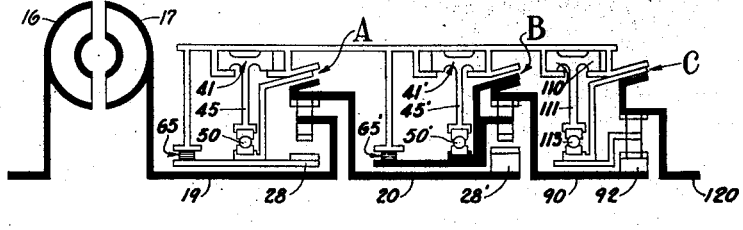
Figure 7 is a diagrammatic view of the transmission of Figure 1, showing the positions of the parts for obtaining a reverse drive.

In Figure 7 I have shown the arrangement of the parts for effecting reverse drive to the final driven shaft. In the selected reverse drive it will be seen that the torque transmitting member 35 of the planetary gear system A is shifted to the left to engage the braking member 36 to effect a ratio drive through this planetary gear system, and that the torque transmitting member 35' of the planetary gear system B is shifted to the right to lock the planet carrier to the ring gear to effect direct drive through this planetary gear system. The third planetary gear system C is utilized to effect the reverse drive to the final driven shaft 120 and this is accomplished by shifting of the torque transmitting member 99 thereof to the left to engage the brake member 100 so that the ring gear is driven in a direction opposite the direction of rotation of the planet carrier. In this position of the parts we have a ratio of 1.42 through the planetary gear system A, a ratio of 2.6 through the planetary gear system B, and direct drive through the planetary gear system C which in conjunction with the 3.28 axle gives a ratio of 12.1. However, it will be seen that other reverse ratios may be obtained as, for example, by positioning of the parts of the planetary gear system A to effect a direct drive, positioning the parts of the planetary gear system B to effect a ratio drive, or if desired to have both planetary gear systems A and B actuated to effect ratio drive through both. It will thus be seen that a number of gear ratios may be obtained for reverse drive, but the one first described is selected as a preferred ratio for reverse drive for an automotive vehicle.

It will thus be observed that when the transmission is utilized to effect forward drive to a vehicle, the planetary gear system C is always locked up to effect a direct drive therethrough, and that the torque transmitting member of this planetary gear system C is only actuated to effect a reverse drive. It will be obvious therefore that there is no necessity of providing a one-way brake or other device for assuring the application of continuous torque from the drive shaft to the final driven shaft to this planetary gear system, since obviously a brake in the torque line is necessary when the vehicle is to be driven forwardly and rearwardly alternately. Also, preferably when the transmission is disposed in neutral, the torque transmitting member of the planetary gear system C is positioned to the right to be in a position to transmit torque transmitting members of the planetary gear systems A and B for driving the vehicle forwardly.

While I have shown what I consider to be a preferred embodiment of my invention it will be understood that various details and rearrangement of parts may be made without departing from the spirit and scope of my invention.

I claim:

1. In a transmission having a fluid coupling comprising an impeller and rotor, the combination therewith of, a first planetary gear system comprising three elements, namely, a sun gear, a ring gear, and a planet carrier having dual planet pinions meshing with said sun gear and said ring gear, a drive shaft for said first planetary gear system conecting one of said elements with said rotor, a first driven shaft connected to a second of said elements, a torque transmitting means for connecting two of said elements to effect a direct drive from said drive shaft to said first driven shaft or for holding the third element of said first planetary gear system against rotation to effect a ratio drive from said drive shaft to said first driven shaft, selectively, a one way brake operable to transmit torque from said drive shaft to said driven shaft with said torque transmitting means in a neutral position, a second planetary gear system comprising three second elements, namely, a second sun gear, a second ring gear, and a second planet carrier having second dual planet pinions meshing with said second sun gear and said second ring gear, said first driven shaft being connected to one of said second elements, a second driven shaft connected to a second of said second elements, a second torque transmitting means for connecting two of said second elements to effect a direct drive from said first driven shaft to said second driven shaft or for holding the third element of said second planetary gear system against rotation to effect a ratio drive from said first driven shaft, to said second driven shaft, selectively, a second one way brake for transmitting torque from said first driven shaft to said second driven shaft in the neutral position of said second torque transmitting means, and a third planetary gear system comprising three third elements, namely, a third sun gear, a third ring gear, and a third planet carrier having single planet pinions meshing with said third sun gear and said third ring gear, said second driven shaft being connected to one of said third elements, a third driven shaft connected to a second of said third elements, and a third torque transmitting means for connecting two of said third elements to effect a direct drive from said second driven shaft to said third driven shaft or for holding the third element of said third planetary gear system against rotation to effect a ratio drive from said second driven shaft to said third driven shaft in a direction opposite the direction of rotation of said first and second driven shafts, selectively.

2. In a transmission having a fluid coupling comprising an impeller and a rotor, the combination therewith of, a housing, a first planetary gear system comprising a first sun gear, a first ring gear, and a first planet carrier having dual planet pinions meshing with said first ring gear and said first sun gear, a drive shaft for said first planetary gear system connecting said planet carrier with said rotor, a first driven shaft connected to said first ring gear, a torque transmitting member associated with said first sun gear operable for securing said first sun gear to said first ring gear for conjoint rotation, or for engaging said housing to hold said first sun gear against rotation to effect ratio drive to said first driven shaft through said planet carrier, selectively, a one way brake associated with said first sun gear and said housing for imparting torque from said drive shaft to said first driven shaft with said torque transmitting member disposed in a neutral position, a second planetary gear system comprising a second sun gear, a second ring gear, and a second planet carrier having second dual planet pinions meshing with said second ring gear and said second sun gear, a second driven shaft connected to said second ring gear, said first driven shaft connecting said second sun gear with said first ring gear, a torque transmitting member associated with said second planet carrier operable for connecting said second planet carrier with said second ring gear for conjoint rotation, or for engaging said housing to hold said second planet carrier against rotation to effect ratio drive to said second driven shaft, selectively, a one way brake associated with said second planet carrier and said housing for holding said second planet carrier against rotation for imparting torque from said first driven shaft to said second driven shaft with said second torque transmitting member disposed in a neutral position, a third planetary gear system comprising a third sun gear, a third ring gear, and a third planet carrier having single planet pinions meshing with said third sun gear and said third ring gear, said second driven shaft connecting said second ring gear to said third sun gear, a third driven shaft connected to said third ring gear, a third torque transmitting member associated with said third planet carrier operable for securing said planet carrier to said third ring gear for conjoint rotation, or for engaging said housing to hold said planet carrier against rotation for driving said third driven shaft in a direction opposite the direction of rotation of said drive shaft and said first and second driven shafts.

HARRY R. GREENLEE.